United States Patent [19]

Newendorp et al.

[11] Patent Number: 4,702,066

[45] Date of Patent: Oct. 27, 1987

[54] ROUND BALER WITH AUTOMATIC STEERING SYSTEM

[75] Inventors: Vincent W. Newendorp; Daryl W. Van Zee, both of Pella, Iowa

[73] Assignee: Vermeer Manufacturing Company, Pella, Iowa

[21] Appl. No.: 889,235

[22] Filed: Jul. 25, 1986

[51] Int. Cl.⁴ ............................................. A01D 39/00
[52] U.S. Cl. ....................................... 56/341; 56/10.2; 100/88
[58] Field of Search ................ 56/341, 10.2, DIG. 15, 56/15.4, 15.5; 100/88, 89, 188 R, 189; 280/467, 468

[56] References Cited

U.S. PATENT DOCUMENTS

| | | | |
|---|---|---|---|
| 2,360,902 | 10/1944 | Simmons | 280/468 |
| 4,065,914 | 1/1978 | Phillips et al. | 56/15.5 |
| 4,224,867 | 9/1980 | Gaeddert et al. | 56/341 |
| 4,433,533 | 2/1984 | Giani | 56/10.2 |
| 4,517,795 | 5/1985 | Meiers | 56/341 |

Primary Examiner—Robert Peshock
Assistant Examiner—John Weiss
Attorney, Agent, or Firm—Rudolph L. Lowell

[57] ABSTRACT

A baler for forming large round bales and drawn behind a tractor has an expandable bale forming chamber for receiving a crop windrow fed thereto by a pick-up device. Sensing means responsive to expansion of the chamber automatically steers the baler relative to the tractor in a sinusoidal path along the crop windrow to feed material over the length of the forming chamber. Turning movements of the baler are alternately in opposite directions transversely of the windrow at the same rate and like degree, and take place with an increasing frequency to a final expansion of the chamber to produce a cylindrical bale of uniform diameter.

5 Claims, 15 Drawing Figures

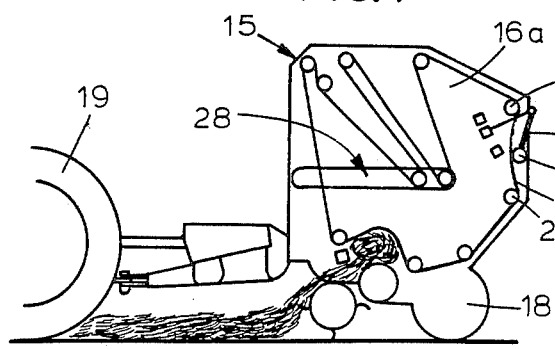
FIG. 7
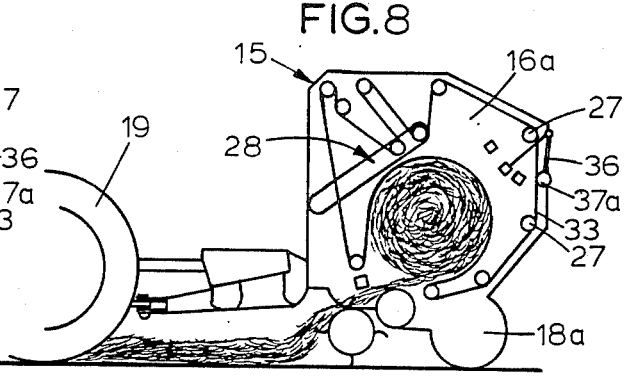
FIG. 8
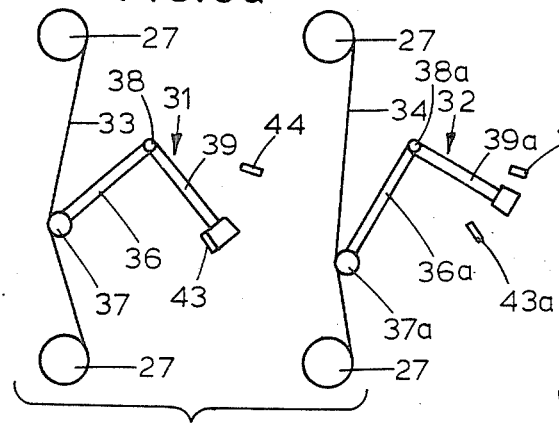
FIG. 9a
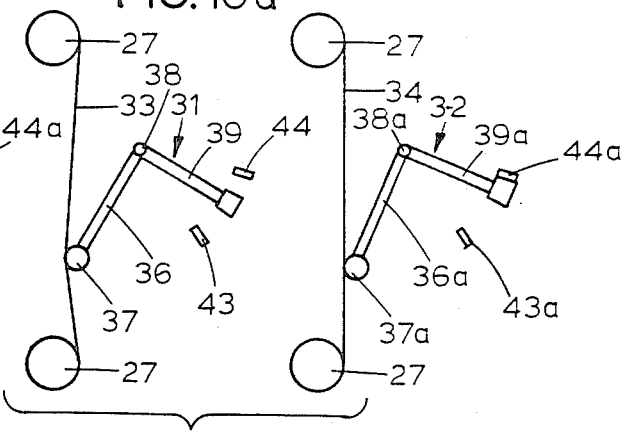
FIG. 10a
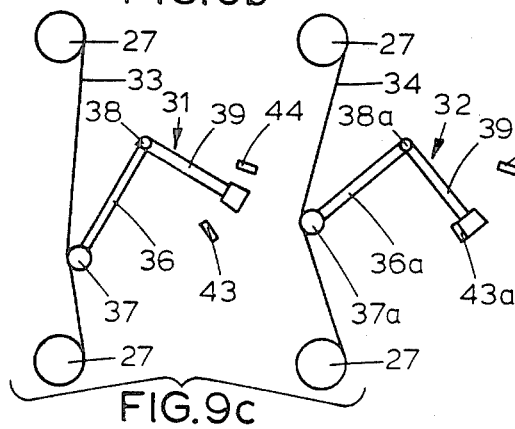
FIG. 9b
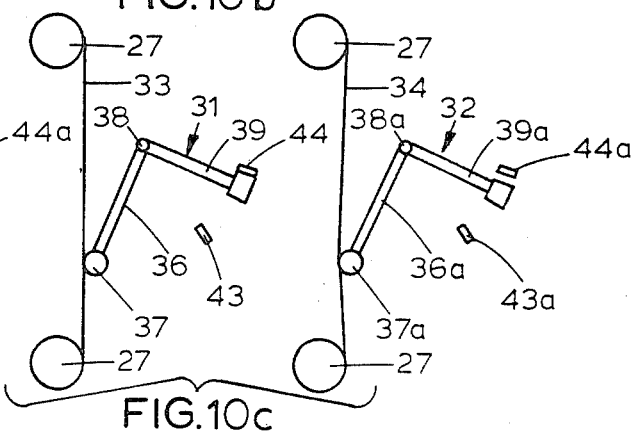
FIG. 10b
FIG. 9c
FIG. 10c

ROUND BALER WITH AUTOMATIC STEERING SYSTEM

BACKGROUND OF THE INVENTION

This invention relates to balers for forming round bales from a crop windrow.

A conventional, well-known type of such a baler is tractor drawn and includes generally a crop pick up mechanism for transferring the crop rearwardly into the inlet of an expandable bale forming chamber defined by a plurality of endless belts movable longitudinally and vertically of the baler in paths spaced transversely of the baler. Such a baler is exemplified in U.S. Pat. Nos. 4,182,101; 4,121,513; and 4,150,527.

In the operation of these balers it is necessary that the tractor operator steer the tractor, and in turn pull the baler, for a uniform feeding of material into the transversely extended baler forming chamber to form a bale of substantially uniform cross-sectional diameter. When this type of operation does not take place and the baler is drawn in a straight path over the windrow, the crop material is fed into only a portion of the chamber inlet to form a bale of non-uniform diameter.

To relieve the tractor operator from constantly observing the feeding pattern of the crop material into the baler and changing such pattern by manipulating the tractor back and forth across the windrow, it was proposed in U.S. Pat. No. 4,065,192 to steer the baler relative to the tractor by a hydraulic system controlled from the tractor. However, although the tractor could be steered in a straight line, the observation and steering of the baler relative to the tractor required the constant attention of the operator.

The inconvenience of the tractor operator having to look behind to observe the feeding action of the baler was removed by the placement in the tractor cab of a gauge responsive to the variation in tension of an end pair of the chamber defining belts, which indicated to the operator the steering direction of the tractor to pull the baler in a sinusoidal path over the crop windrow. Substantially the same operation for baler feeding of a crop windrow is disclosed in U.S. Pat. No. 4,224,867.

An automatic steering of a baler relative to the tractor is disclosed in U.S. Pat. No. 4,433,533 wherein the relative diameter of a bale being formed is detected at two axially spaced locations on the periphery of the bale and the baler automatically steered in response to a generated signal representative of the relative diameter.

This steering of the baler relative to the tractor, and in turn to the crop windrow results in the feeding of the crop material into that portion of the bale forming chamber corresponding to the bale periphery location having the smaller diameter responsive to the generated signal. Since the baler is steered by a single double acting hydraulic cylinder and the signal generated in response to the effective resistance of two rheostats at the spaced locations the steering movement for a given signal is greater in one direction than the other, and with such steering movements being of a reduced frequency as the bale diameter increases so that irregularities are created in the diameter of the completed bale. The present invention provides an improved automatic steering means for a round crop baler which enables a consistent forming of round bales of a uniform cylindrical shape and density.

SUMMARY OF THE INVENTION

The invention provides for the automatic steering of a round baler relative to a towing tractor and laterally of a crop windrow to maintain a uniform diameter of the bale during formation. Sensing means associated with each belt at the end of a bale forming chamber functions during the initial baling operation in response to belt slackness and in the later baling operation in response to belt tension to actuate the baler steering mechanism for travel of the baler in a sinusoidal path longitudinally of a crop windrow. The steering movement of a pair of steering wheels is maintained to a like degree in either direction by a double acting hydraulic cylinder assembly associated with each wheel and wherein the cylinder assemblies are simultaneously actuated.

The frequency of the alternative turning movements of the steering wheels increases progressively with the progressive increase in the tension of the bale chamber end belts whereby as the bale approaches completion smaller portions of crop material are fed over the length of the bale forming chamber so as to minimize irregularities in the diameter of the completed bale.

DESCRIPTION OF THE DRAWINGS

FIG. 7 diagrammatically illustrates the position of a sensing device when the bale is being initially formed and the bale forming belts are loose;

FIG. 8 diagrammatically illustrates the position of a sensor device when the bale is about half size and the belt forming bales are being subjected to tension;

FIGS. 9a, 9b, and 9c illustrate diagrammatically the relative positions of the sensor devices located at opposite ends of the bale forming chamber when a bale is being initially formed;

FIGS. 10a, 10b, and 10c illustrate diagrammatically the relative positions of the sensor devices at the opposite ends of the bale forming chamber when a bale is about half size.

DESCRIPTION OF THE INVENTION

Figure 1:
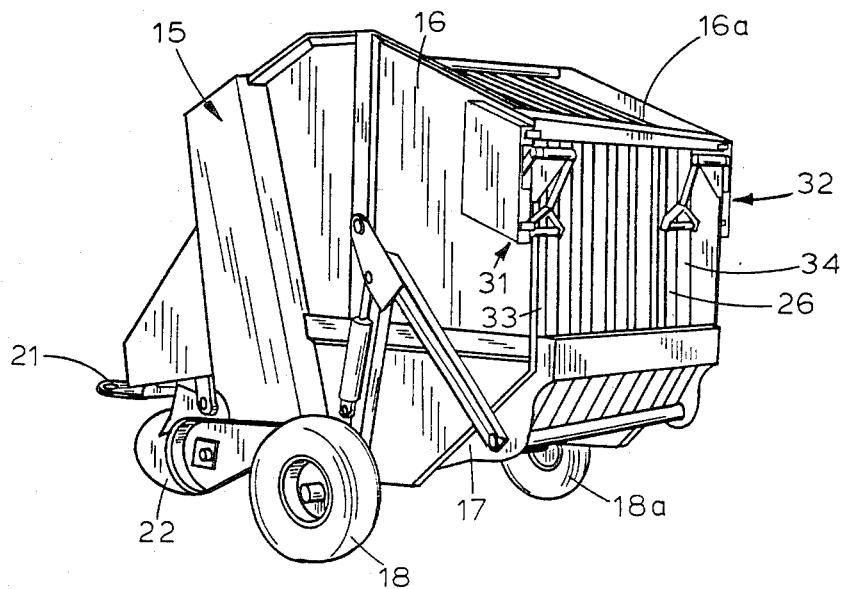
FIG. 1 is a perspective view of a large bale forming machine equipped with the automatic steering system of this invention.
Figure 2:
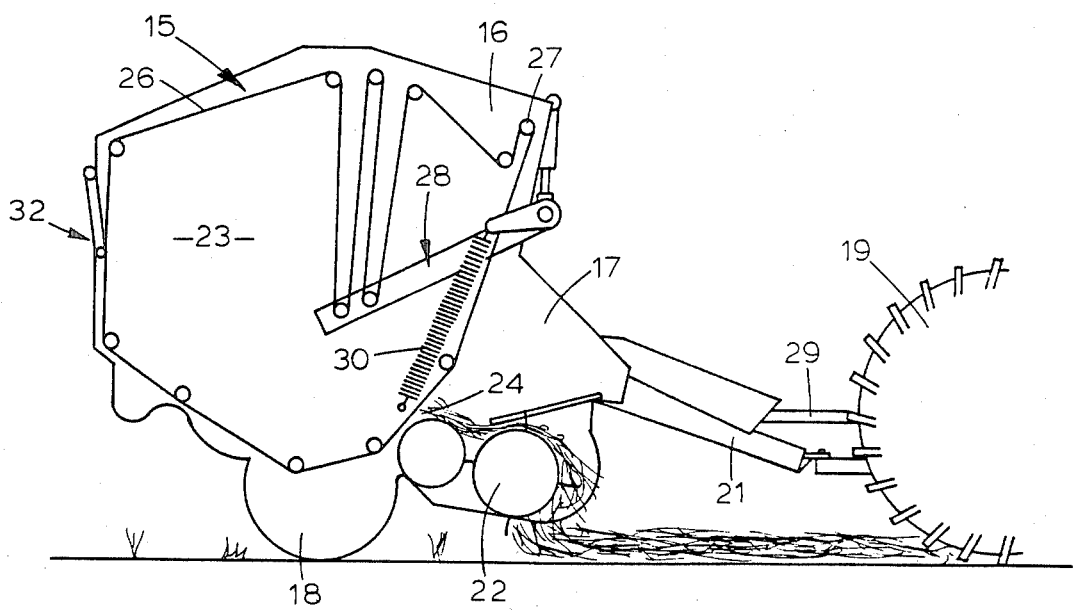
FIG. 2 is a schematic side elevational view of the baler of FIG. 1 with the near side wall removed to show mechanism within the baler.

Referring to FIGS. 1 and 2, the baler 15 includes a pair of laterally spaced apart side walls 16 and 16a which form a part of the baler frame structure 17 that is carried on a pair of steerable ground wheels 18 and 18a.

The baler is towed along a windrow of crop material by a tractor 19 that is connected in a usual manner to a tongue structure 21 extended forwardly from the frame 17. A crop pick-up mechanism 22 delivers the windrowed crop material into a bale forming chamber 23 having an inlet 24 and defined by the side walls 16 and 16a and endless belts 26 that are carried on rollers 27 extended between and rotatably carried on the side walls 16 and 16a. The belts 26 are extendible to increase the diameter of the bale forming chamber 23 in response to the bale growth during a bale forming operation. This extension of the belts is provided in a well-known manner by a belt tensioning assembly 28. The pick-up mechanism 22 and belts 26 are tractor driven by means including a power take-off drive indicated at 29.

To provide for a desired cylindrical shaping of a completed bale, it is desirable that the baler 15 be moved in a serpentine path following the windrowed crop material so as to distribute the picked up material evenly between the side walls 16 and 16a or ends of the bale forming chamber 23.

In the present invention, this serpentine or sinusoidal travel of the baler 15 is accomplished automatically by steering the baler relative to the linear advance of the tractor along the windrowed crop material in response to a crop loading monitoring system that includes a pair of belt sensor units 31 and 32, hereinafter for convenience to be referred to as a "left-hand sensor" and a "right-hand sensor", respectively. A sensor unit 31 and 32 is in operative association with an end belt 33 and 34, respectively, located at opposite ends of the bale forming chamber 23 at positions adjacent a side wall 16 and 16a. Since the sensor units 31 and 32 are identical in construction and operation and are similarly associated with an end belt 33 and 34 and a steering wheel 18 and 18a, only the left-hand sensor unit 31 will be described in detail, with like numbers having the suffix letter "a" being applied to like parts.

Figure 3:
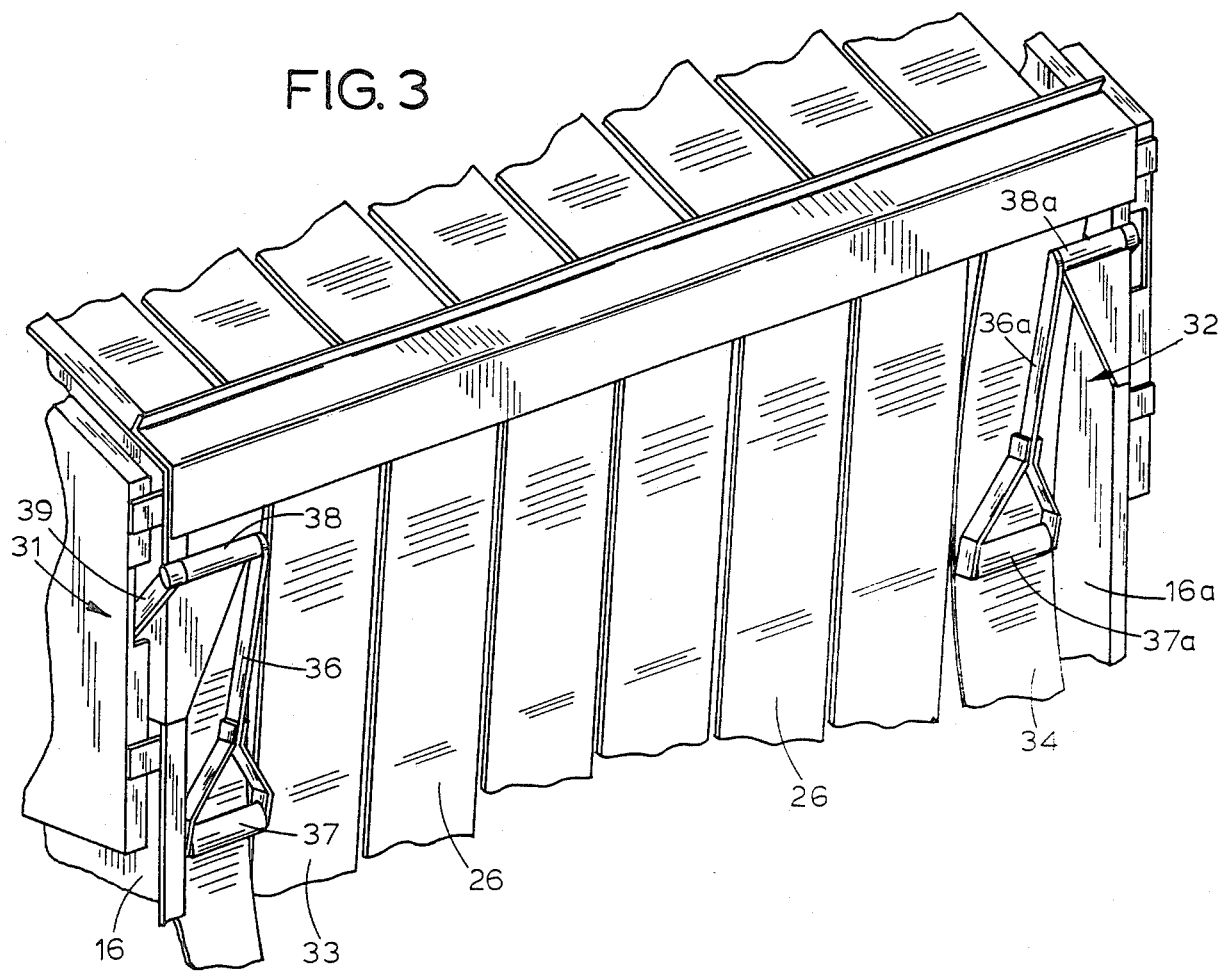
FIG. 3 is an enlarged detail perspective view showing the assembly of sensor devices with associated bale forming belts.
Figure 6:
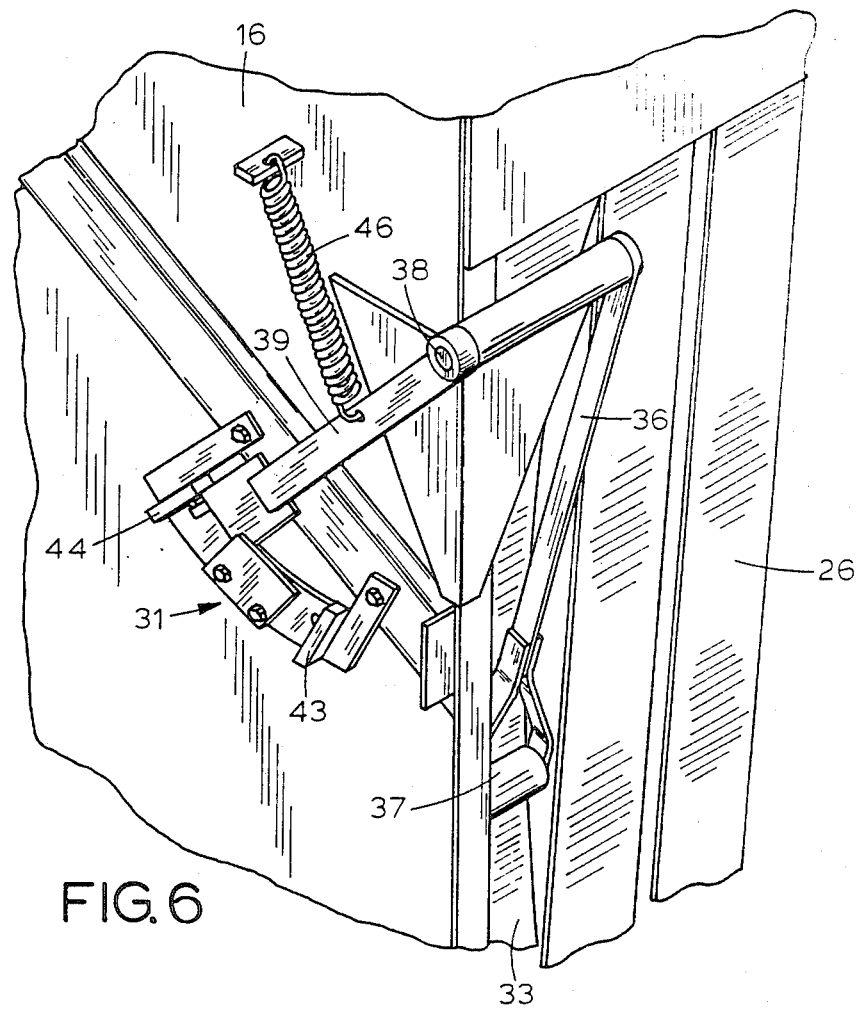
FIG. 6 is an enlarged detail perspective view showing the assembly relation of a bale sensor device and its associated bale forming belt.

The sensor unit 31 (FIGS. 3 and 6) includes a swinging lever arm 36 having a belt engaging roller 37 at one end and its opposite end secured to a rock shaft 38 rotatably mounted on the adjacent side wall 16 for swinging movement in a plane parallel to and spaced inwardly of the side wall 16. A switch actuating arm 39 (FIG. 6) has one end secured to the rock shaft 38 for swinging movement in a plane parallel to and outwardly of the side wall 16 in response to the swinging movement of the roller supporting lever 36. The lever arm 39 functions as an actuator to selectively operate a pair of limit switches 43 and 44 carried on the adjacent side wall 16. A coil spring 46 is attached to the actuator 39 and to the adjacent side wall 16 in a manner to yiedlably maintain the roller 37 in contact engagement with the end belt 33. The pressure applied by the spring 46 on the end belt 33 is less than the pressure applied thereon by the spring 30 of the belt tensioning device 28.

In the operation of a baler 15, the belt tensioning device 28 provides for the extension or lengthening of the belt in response to the size increase of a bale being formed within the chamber 23. This extension takes place concurrently with the belts 26 being maintained with compactive force against the forming bale and in driving engagement with the bale rather than slipping along its peripheral surface. The tensioning device 28 thus functions to tension all of the belts 26 and will pay out additional length anytime the force of the spring 30 is overcome by the growth of the bale in the forming chamber 23.

As a result, when crop material begins to accumulate more heavily at one end of the chamber 23 than at the other end thereof, the belt adjacent the end of the bale receiving less material will slacken relative to the other belts 26. Thus, when too much material enters one end of the bale forming chamber 23, relative to the opposite end thereof, such excessive amount of material will act on one or the other of the belts 33 or 34 to actuate the sensor unit 31 or 32 associated therewith.

Figure 5:
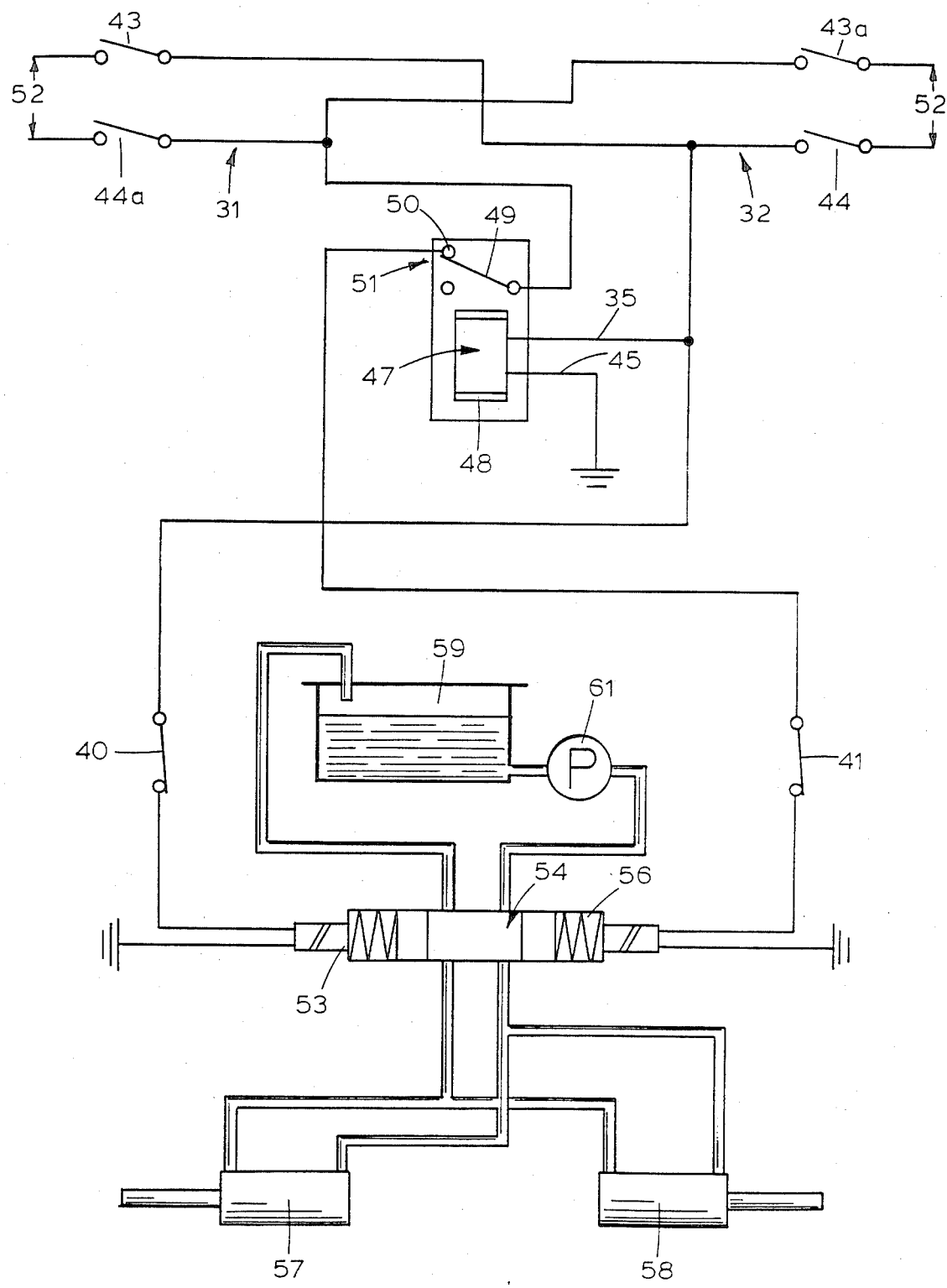
FIG. 5 is a schematic diagram of the electrical and hydraulic control systems for steering the baler wheels.

The actuated sensor unit 31 or 32 will in turn actuate the steerable wheels 18 and 18a to steer the baler relative to the windrow in a direction to reduce or cut off the supply of crop material to the chamber end being excessively fed. In FIG. 5, there is illustrated schematically the electrical and hydraulic control circuits for controlling the steering action of the baler to automatically follow a serpentine path over a windrow in response to an actuation of the sensor units 31 and 32 by the tension changes in the end belts 33 and 34, respectively.

The electrical control circuit (FIG. 5) includes a priority relay 47 which discriminates between the alternate pairs of the limit switches 43 and 44 and 43a and 44a of the sensor units 31 and 32, respectively. The priority relay 47 is a single throw, single pole 12 volt relay having a coil 48, a spring contact 49 biased to a normally closed position with an output contact 50 defining a normally closed switch 51. One side 45 of the coil 48 is connected to the ground and the other side 35 thereof is attached to what for convenience will be called the "left loose limit switch" 43 and the "right tight limit switch" 44 of the sensor unit 31. The limit switches 43 and 44 are normally open and associated with a 12 volt power source 52. In a similar manner, the spring contact 49 is connected to both the right loose limit switch 43a and to the left tight limit switch 44a of the sensor unit 32.

The side 35 of the relay coil 48 is connected through a right turn limit switch 40 to a first side 53 of a hydraulic solenoid valve 54. Similarly, the output contact 50 of the switch 51 is connected through a normally closed left turn limit switch 41 to a second side 56 of the solenoid valve 54.

The solenoid valve 54 operates to concurrently control the flow of fluid under pressure to a pair of double acting hydraulic cylinders, namely, a left hand cylinder 57 for the left steering wheel 18 and a right hand cylinder 58 for the right steering wheel 18a. When the first side 53 of the solenoid valve 54 is energized, fluid from a reservoir 59 is supplied by a pump 61 provided on the tractor 19 to extend the right hand cylinder 58 concurrently with a retraction of the left hand cylinder 57. In a similar manner when the second side 56 of the solenoid valve 54 is energized, fluid is supplied from the pump 61 to extend the left hand cylinder 57 concurrently with the retraction of the right hand cylinder 58.

When the baler 15 is empty the tension springs 46 and the loose belt limit switches 43 and 43a are adjusted so that neither switch is closed by its associated actuating arm 39 or 39a but wherein any additional loss of tension in the slack of belts 33 and 34 will result in one or the other of the switches 43 and 43a being triggered.

As a bale core is initiated, the crop material is fed to the side of the baling chamber indicated by the priority selection of the solenoid 48. As soon as crop material begins to roll under the belts 26 (FIG. 7) the belt tension increases so as to act against the belt tensioning device 28 which results in the triggering action of the loose limit switches 43 and 43a and the resultant energization of the solenoid valve 54 to alternate the right and left hand steering movements of the baler 15. As mentioned above, this process will repeat itself until the bale reaches the diameter of about three feet, illustrated in FIG. 8.

Thus, when a baling operation is initiated, both of the end belts 33 and 34 are relatively slack so that the actuating arms 39 and 39a are in near contact engagement with the left and right hand loose limit switches 43 and 43a, respectively, (FIG. 9a). With all the limit switches 43 and 43a and 44 and 44a being open, as shown in FIG. 5, the hydraulic cylinders 57 and 58 are in their neutral or non-steering positions so that the baler 15 follows in a straight line the linear travel of the tractor 19.

FIG. 9b illustrates a condition in the initial formation of a bale wherein excessive crop material is fed to the right hand side of the bale forming chamber 23 so that the right end portion of the bale core has grown larger than the left end portion thereof. This condition causes the left loose limit switch 43 to close whereby the relay coil 48 is energized to pull the spring contact 49 out of engagement with the output contact 50 to open the switch 51. With the switch 51 opened, the first side 53 of the hydraulic solenoid valve 54 is energized to operate the hydraulic cylinders 57 and 58 to steer the baler 15 to the right. This right hand turning movement of the baler directs the picked up crop material preferentially towards the left side of the baling chamber 23.

Figure 4:
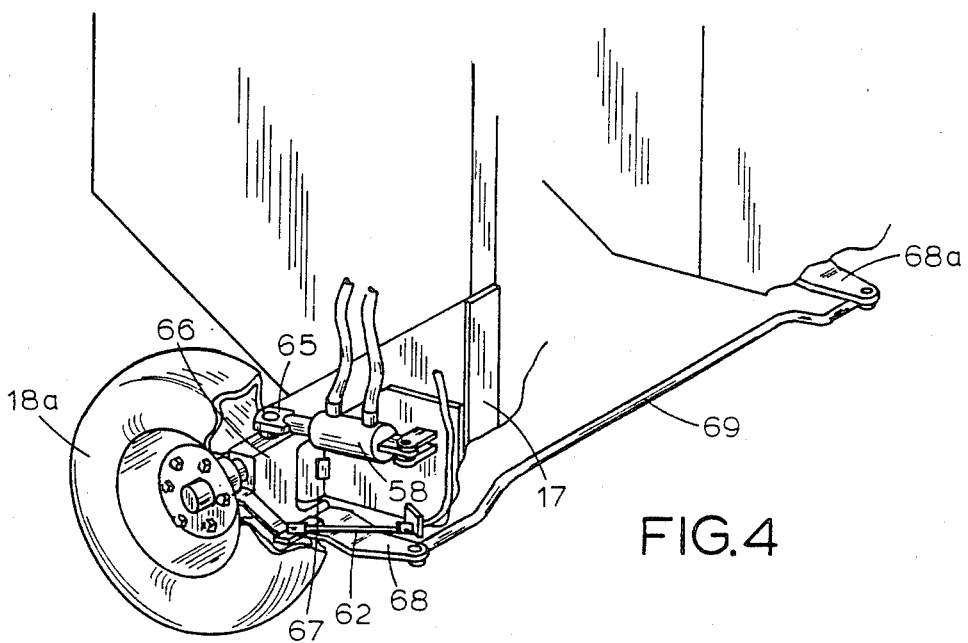
FIG. 4 is a detail perspective view of the hydraulic steering mechanism for steering the baler wheels in response to actuation of the bale sensor devices with only one of each wheels being illustrated.

The steering movement of the baler in the left and right hand directions thereof is limited (FIG. 4) by the actuation of one of the limit switches 40 and 41 (FIG. 5) by an associated actuator, with only the actuator 62 for the right hand wheel being shown in FIG. 4. When the right hand turning limit has been reached, the right turn limit switch 40 is opened whereby to discontinue any further right hand turning movement of the steering wheels 18 and 18a by their respective hydraulic cylinders 57 and 58.

The preferential feeding of material to the left hand side of the baling chamber 23 will continue until the left end portion of the bale being formed is increased to a relatively larger size than the right end portion causing the right hand end belt 34 to slacken and the right loose limit switch 43a to be actuated as illustrated in FIG. 9c. When the right loose limit switch 43a is closed (FIG. 5), the second side 54 of the solenoid valve 54 is energized to operate the hydraulic cylinders 57 and 58 in unison to steer the baler 15 to the left to preferentially direct the crop material to the right hand side of the bale forming chamber 23. This left steering movement of the baler will continue until the right hand hydraulic cylinder 58 operates the actuator 60 for the right turn limit switch 40 to stop the turning operation of the hydraulic cylinders 57 and 58.

Figure 11:
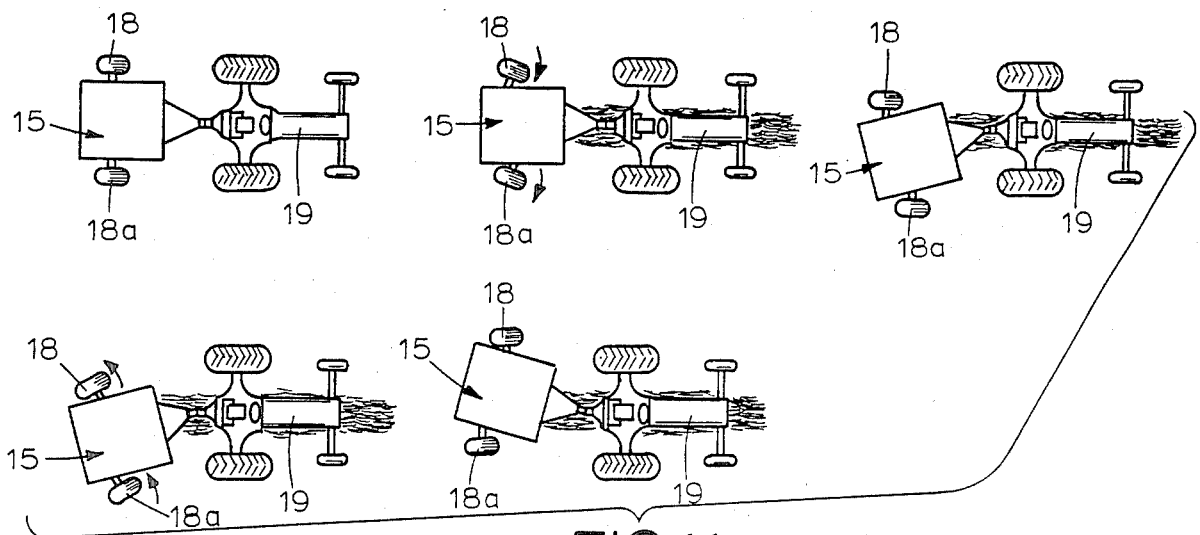
FIG. 11 illustrates diagrammatically the sinusoidal path automatically taken by the baler machine, during a bale forming operation, in response to the bale sensor devices.

This alternate closing of the left hand and right hand loose limit switches 43 and 43a takes place during the early stages of bale formation and usually until a formed bale has enlarged to a diameter of about three feet (FIG. 8). As illustrated in FIG. 11, this automatic alternate left hand and right hand steering of the baler 15 results in the baler following a generally serpentine or sinusoidal path rearwardly of the tractor 19, as the tractor advances in a straight line along a windrow.

As the bale continues to build in diameter, the spring tension in the belt tensioning device 28 also increases. This results in more crop material being required to increase the belt tension by an amount sufficient to lift or operate the belt tensioning device 28 so as to allow an actuator arm 39 or 39a to swing or rotate far enough, with respect to its associated end belt, to trigger a loose belt limit switch 43 or 43a. If this condition is permitted to continue until the bale reaches full size from a half size therefor, the tension difference will become excessive and result in a non-uniform compression of the bale across its full width. On ejection of the bale thus formed from the baler machine, that portion of the bale which is compressed more tightly than the remaining portions thereof, will swell out or expand and the remaining portions will sag, when the bale is ground supported, causing the bale to be of a cone or pear shape.

Since the bale compression is directly proportional to the amount of tension required to lift or overcome the tension applied by the tensioning device 28, it is necessary to obtain a compact or dense bale that the tension increase required for operating the sensor devices 31 and 32 be reduced as the bale diameter increases from half size to the full size thereof.

This is accomplished in the present invention by connecting the tight limit switches 44 and 44a in parallel to the loose limit switches 43 and 43a but which function to provide baler steering movement when the tension in the belts 33 and 34 increases to meet the maximum tension applied on the actuating arms 39 and 39a. Stated otherwise, the tight belt limit switches 44 and 44a function such that a loose belt signal from one end of the bale being formed and a tight belt signal from an opposite end of the bale will both trigger the priority coil 47 in the same direction (FIG. 5).

As the pressure applied by the belt tensioning device 28 increases, the roller supporting lever arms 36 and 36a will be moved progressively outwardly of their associated belts 33 and 34, respectively, until a tight belt limit switch 44 or 44a is triggered (FIGS. 10a–10c). This trigger action will alternate between the limit switches 44 and 44a in response to the high tension variations in the end belts 33 and 34 rather than in the previous utilized slack or low tension variation in such belts in the triggering of the loose belt limit switches 43 and 43a. As the pressure applied by the belt tensioning device 28 continues to increase less additional belt tension will be required to trigger a tight limit switch 44 or 44a so that the tension difference between the belts 33 and 34 at the opposite ends of the bale being formed will continue to decrease as the bale increases in diameter. Since this tight belt triggering action takes place with a greater frequency than did the triggering action of the loose limit switches 43 and 43a, a uniform bale diameter is maintained as the bale approaches full size.

The function of the sensor devices 31 and 32 to utilize the high tension in the belts 33 and 34 to evenly form a bale as it approaches completion, is illustrated in FIGS. 10a–10c, inclusive. FIG. 10a illustrates the condition wherein the right end portion of the bale exceeds in diameter the left hand portion thereof, by an amount sufficient to close the right hand right limit switch 44. As shown in FIG. 5, closing of the right hand tight limit switch 44 energizes the relay coil 48 to open switch 51 whereby to energize the side 53 of the solenoid valve 54. When thus energized, the solenoid 54 operates the hydraulic cylinders 57 and 58 to steer the baler to the right and preferentially direct the picked up material to the left side of the baling chamber 23. When the left hand cylinder 57 has been retracted to operate the associated actuator 62, the right turn limit switch 40 is open and the solenoid valve 54 energized so as to shut off the supply of fluid under pressure to the cylinders 57 and 58.

When the circumference of the left hand portion of the bale being formed exceeds the circumference or diameter of the right hand portion of the bale an amount sufficient to close the left hand tight limit switch 44a the right hand tight limit switch 44 is opened as illustrated in FIG. 10b. At this time, the side 56 of the solenoid valve 54 will become energized and the hydraulic cylinders 57 and 58 operate to turn the baler 15 to the left to feed crop material to the right portion of the bale. When this turning movement operates the associated actuator 62, the right turn limit switch 40 will be opened to stop any further right turn movement. When the circumference of the right hand portion of the bale exceeds the circumference of the left hand portion, the right tight limit switch will again be triggered, as shown in FIG. 10c, to repeat the function described in connection with FIG. 10a.

Similarly to the alternate opening and closing of the loose limit switches 43 and 43a, the alternate opening and closing of the tight limit switches 44 and 44a will act to oscillate the baler from side to side in a serpentine path as illustrated in FIG. 11, to automatically form a bale of uniform circumference over its entire length.

As shown in FIG. 4 for the right steering wheel 18a, its associated cylinder 58 is connected at one end to the baler frame 17 and at an opposite end 65 to a wheel support 66 pivotally movable about a king pin unit 67 in response to retraction and extension of the cylinder 58. The support 66 has a forwardly extended lever arm 68 pivotally connected at its front end to one end of a tie rod 69 having its opposite end pivotally connected to the front end of a forwardly extended lever arm 68a on the wheel support for the left steering wheel 18. The actuator 62 for the right turn limit switch 40 is illustrated as a Bowdin wire assembly. It is to be noted that the frequency of the turning movement of the baler in reverse directions will increase as the bale grows due to the decrease in the tension differences between the belts 33 and 34 in response to the decrease in the amount of material supplied to opposite ends of the bale in a turning movement.

In the earlier stages of bale formation (FIG. 7) the loose limit switches 43 and 43a are alternately closed and opened, as illustrated in FIGS. 9a–9c, inclusive. The triggering of the loose limit switches, however, requires that the difference in circumference of the outer portions of a bale being formed be relatively substantial before one or the other of such switches 43 and 43a will be closed. This substantial difference in circumference is the result of a relatively large amount of crop material being fed to one or the other end portions of the baling chamber 23 in a turned direction of movement of the baler.

Although the invention has been described with respect to a preferred embodiment thereof, it is to be also understood that it is not to be so limited since changes and modifications can be made therein which are within the full intended scope of this invention as defined by the appended claims.

We claim:

1. A round crop baler machine, including:
(a) a main frame,
(b) an expandable bale-forming chamber on said main frame extending transversely of the baler,
(c) means for feeding a crop windrow into said chamber,
(d) a plurality of endless belts for defining said chamber movable in longitudinally and vertically extended paths in parallel planes spaced transversely of the baler, with a belt adjacent each end of said chamber,
(e) tension means providing for an initial belt tension in the starting of a bale and for a progressively increasing belt tension during the growth of a bale in said forming chamber,
(f) a belt sensing means for each of said end belts for sensing the tension changes in said end belts, said sensing means being alternately actuated by tension variations in said end belts during the expansion of said chamber by a blae being formed,
(g) a pair of steerable wheels for supporting said frame,
(h) a power unit for each of said steering wheels,
(i) means connecting said wheels for concurrent steering movement in response to a concurrent operation of said power units,
(j) means for controlling the concurrent operation of said power units in response to an actuation of either one of said sensing devices to alternately steer said baler in opposite directions laterally of the crop windrow, whereby to form a bale in said chamber of a substantially uniform diameter,
(k) each of said power units is a double acting hydraulic cylinder assembly, and
(l) a hydraulic circuit having means for supplying fluid under pressure to said power units, and a solenoid actuated hydraulic valve unit for concurrently controlling the supply of fluid under pressure to said power units, and an electrical circuit for said belt sensing means and valve unit for operating said power units in response to the alternate actuation of said sensing means,
(m) each of said sensing means including a pair of limit switches in said electrical circuit and a movably mounted actuating arm movable, in response to the tension variations in an end belt during the bale forming expansion of said chamber, into contact with one or the other of said limit switches to operate said power units, and
(n) said actuating arm movable into and out of contact engagement with one of said limit switches during the initial forming of a bale in said chamber, and into and out of contact engagement with the other one of said limit switches in the final forming of a bale in said chamber.

2. A round crop baler machine, including:
(a) a main frame,
(b) an expandable bale-forming chamber on said main frame extending transversely of the baler,
(c) means for feeding a crop windrow into said chamber,
(d) a plurality of endless belts for defining said chamber movable in longitudinally and vertically extended paths in parallel planes spaced transversely of the baler, with a belt adjacent each end of said chamber,
(e) tension means providing for an initial belt tension in the starting of a bale and for a progressively increasing belt tension during the growth of a bale in said forming chamber,
(f) a belt sensing means for each of said end belts for sensing the belt tension changes in said end belts between predetermined minimum and maximum limits to produce alternate output signals within said limits during the expansion of said chamber by a bale being formed, (g) a pair of steerable wheels for supporting said frame, and (h) means for controlling the operation of said steering wheels in response to the output signal of only one or the other of said sensing devices to alternately steer said baler in opposite directions laterally of the crop windrow, whereby to form a bale in said chamber of a substantially uniform diameter.

3. A round crop baler machine according to claim 2 including:

(a) an electrical circuit for said sensing means including for each of said sensing means a pair of limit switches and a movable mounted actuating arm movable, in response to the tension variations in an end belt during the bale forming expansion of said chamber, into contact with one or the other of said limit switches to actuate said control means.

(b) said actuating arm movable into and out of contact engagement with one of said limit switches during the initial forming of a bale in said chamber, and into and out of contact engagement with the other one of said limit switches in the final forming of a bale in said chamber.

4. A round crop baler machine according to claim 3 wherein:

(a) said electrical circuit includes a relay interconnected with said limit switches to provide for a steering movement of said steerable wheels only in response to the movement of the actuating arm of that one of said sensing means which contacts an associated limit switch prior to the movement of the actuating arm of the other one of said sensing means into contact with an associated limit switch.

5. A round crop baler machine according to claim 2 wherein:

(a) said belt sensing means, in response to the increase in tension in said end belts as the chamber is expanded by a bale being formed, tending to product alternate output signals less frequently during the forming of a bale to about half size therefor, and then more frequently during the forming of a bale from the half size to the full size therefor.

* * * * *